(12) United States Patent
Nakamura et al.

(10) Patent No.: US 6,189,323 B1
(45) Date of Patent: Feb. 20, 2001

(54) AIR CONDITIONER WITH IMPROVED VALVE CONTROLLER AND VALVE CONTROL METHOD THEREFOR

(75) Inventors: Yoshihiro Nakamura, Yorii-machi; Ryoji Nakanishi, Oota; Yuji Kamoda, Ageo, all of (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/255,536

(22) Filed: Feb. 22, 1999

(30) Foreign Application Priority Data

Feb. 25, 1998 (JP) ................................................ 10-060463

(51) Int. Cl.[7] .................................................... G05D 23/32
(52) U.S. Cl. ....................... 62/157; 137/595; 251/129.05; 236/78 C
(58) Field of Search ........................ 62/231, 157, 324.6; 137/595; 165/101, 294; 236/78 C; 251/129.05

(56) References Cited

U.S. PATENT DOCUMENTS 4,637,817 * 1/1987 Archibald et al. ............... 137/595 X
4,914,566 * 4/1990 Osteutermann ............. 251/129.05 X

FOREIGN PATENT DOCUMENTS

0592033 A1 * 4/1994 (EP) .................................. 236/78 C

* cited by examiner

Primary Examiner—William Wayner
(74) Attorney, Agent, or Firm—Darby & Darby

(57) ABSTRACT

In an air conditioner having a plurality of valves for adjusting the flow of refrigerant circulating in an outdoor unit and an indoor unit, and a controller for controlling the opening degree of each of the valves while successively switching the control target value between these valves and a valve control method for the air conditioner, the controller judges whether the opening degree of a currently-operated (controlled) valve which is currently being subjected to the opening degree control operation is coincident with a target value. If the opening degree of the valve reaches the target value even within a predetermined one-operation time set for the valve, the control target valve is immediately switched to a next valve. Further, if the opening degree of the valve does not reach the target valve even after the predetermined one-operation time, the one-operation time is extended to continue the opening degree control operation on the currently-operated valve.

8 Claims, 5 Drawing Sheets

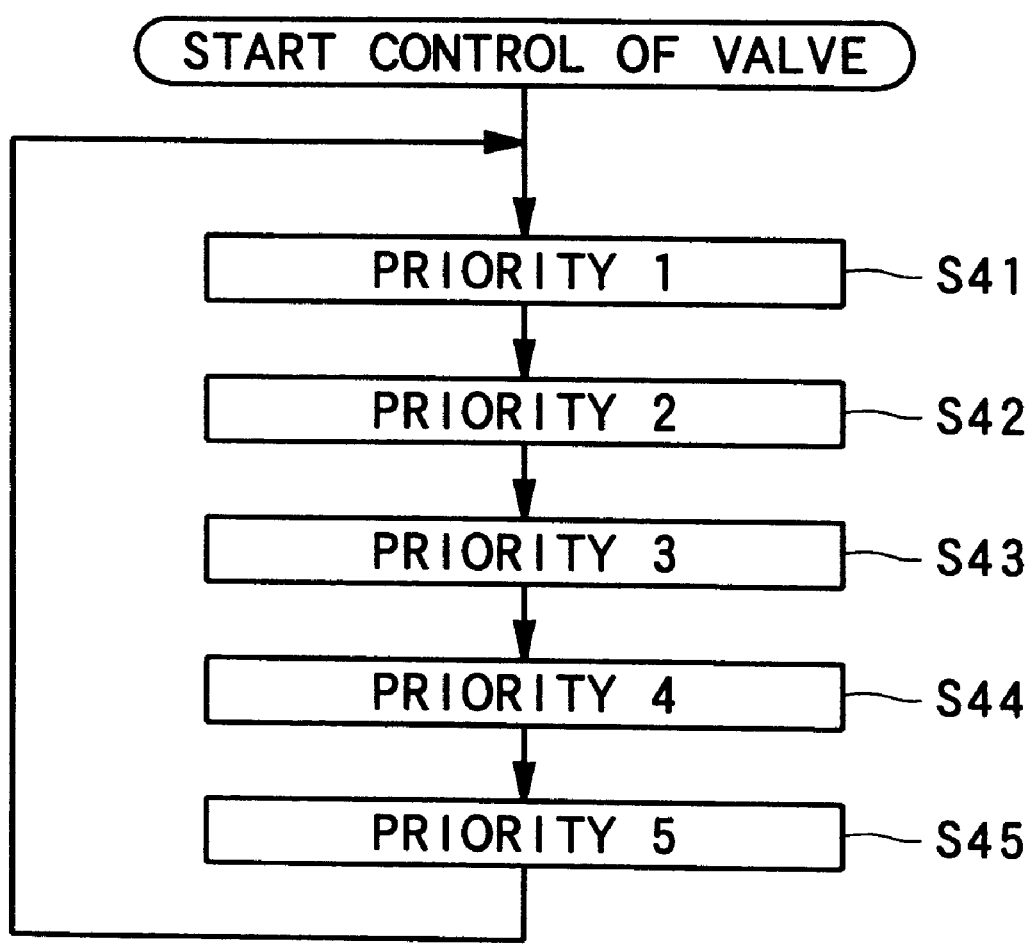

AIR CONDITIONER WITH IMPROVED VALVE CONTROLLER AND VALVE CONTROL METHOD THEREFOR

BACKGROUND OF THE INVENTION

1. Field of the Invention

The present invention relates to an air conditioner in which the operation of the opening degree of a plurality of valves for controlling flow of refrigerant is improved, and a method of controlling the opening degree of the valves of the air conditioner.

2. Description of the Related Art

There have recently been increasing tendencies to use a gas heat pump type air conditioner using a gas engine as a driving source for driving a compressor in an outdoor unit. Such an air conditioner has an outdoor unit, an indoor unit and a controller for controlling the operation of the outdoor unit and the indoor unit. In some air conditioners, a plurality of (for example, five) electrically operated (motor-operated) valves for controlling the flow of refrigerant circulating in both the outdoor unit and the indoor unit are mounted in the outdoor unit, and these electrically operated valves are successively switched to control (perform the controlling operation on) the opening degree of each electrically operated valve.

The control operation of the opening degree of each of the plural electrically operated valves by the controller is performed as follows. Priorities are assigned to the respective electrically operated valves fixedly (with no alteration) in order of reducing the frequency of the controlling operation, and one operation time needed to perform the controlling operation of the opening degree of each electrically operated valve is set to a fixed time for each electrically operated valve, and the plural electrically operated valves are equally and time-divisionally controlled under the restriction on the operation time in order of decreasing precedence.

FIG. 1 is a flowchart showing the controlling operation of the opening degree of each electrically operated valve by the controller.

The controller assigns priorities to a main electrically operated valve, a first diversion electrically operated valve, a second diversion electrically operated valve, a third diversion electrically operated valve and a bypass electrically operated valve in this order, and sets the operation time needed to operate each electrically operated valve to 1000 msec, for example. As shown in FIG. 1, at the control start time of the electrically operated valve, the controller first clears a built-in timer (step S101), and operates the opening degree of the main electrically operated valve having the highest priority (step S102).

Subsequently, the controller judges whether the operation time elapses (step S103). The controller clears the timer just when the time-lapse of the operation time is judged (step S104), and operates the opening degree of the first diversion electrically operated valve having the second highest priority (step S105). Thereafter, the controller also judges whether the operation time elapses (step S106). It clears the timer just when the time-lapse of the operation time is judged. (step S107), and operates the opening degree of the second diversion electrically operated valve having the third highest priority (step S108). Further, as in the same manner as described above, the controller successively operates the opening degree of the third diversion electrically operated valve and the bypass electrically operated valve having the lower priorities in this order (step S109 to step S112). The controller returns to the step S101 just when the operation time of the bypass electrically operated valve elapses, and repeats the processing of the steps S101 to S112.

Since the controller controls the plural electrically operated valves as described above, when the opening degree of any electrically operated valve (for example, the main electrically operated valve) has reached a target opening degree within the one operation time (i.e., before the operation time elapses), the remaining time of the one operation time is wasted as a standby time for which no operation is carried on the main electrically operated valve. Therefore, the standby time of each electrically operated valve as described above finally causes increase of the total operation time needed to complete the operation of the opening degree for all the electrically operated valves, resulting in reduction of controllability of the electrically operated valves by the controller.

Further, the one-operation time which is needed to operate (control) the opening degree of each electrically operated valve once is settled to a fixed time uniformly among the electrically operated valves. Therefore, for example when the opening degree of any electrically operated valve (for example, the main electrically operated valve) cannot be set to a target opening degree within the one-operation time, the main electrically operated valve must wait for a next operation time which will come after the respective one-operation times for the first diversion electrically operated valve, the second diversion electrically operated valve, the third diversion electrically operated valve and the bypass electrically operated valve elapse. As a result, the control operation of the opening degree of the main electrically operated valve which must be originally instantaneously performed is delayed, resulting in reduction of controllability of the electrically operated valves by the controller.

Still further, when an electrically operated valve which is higher in operation frequency is varied in accordance with the operation situation of an air conditioner, for example, even when it becomes unnecessary to operate the first diversion electrically operated valve, the opening-degree controlling operation of the second diversion electrically operated valve, the third diversion electrically operated valve and the bypass electrically operated valve must wait until the one-operation time of the first diversion electrically operated valve elapses. Therefore, the operation of the second diversion electrically operated valve, the third diversion electrically operated valve and the bypass electrically operated valve is delayed, and thus the controllability of the electrically operated valves by the controller is reduced.

SUMMARY OF THE INVENTION

The present invention has been implemented in view of the foregoing situation, and has an object to provide an air conditioner in which a plurality of valves are successively switched to control (operate) the opening degree of each valve, thereby enhancing the controllability of the valves.

In order to attain the above object, according to a first aspect of the present invention, an air conditioner having at least one outdoor unit, at least one indoor unit and a controller for controlling the operation of the outdoor unit and the indoor unit, in which at least one of the outdoor unit and the indoor unit is provided with a plurality of valves for adjusting the flow of refrigerant circulating in the outdoor unit and the indoor unit, the valves being successively switched by the controller to control the opening degree of each of the valves (perform the opening-degree control operation of the valves), is characterized in that the controller has judgment means for judging whether the current opening degree of a valve which is currently being subjected to the opening degree control operation is coincident with a target value, and switching means for switching the control target valve from the currently-controlled valve to a next valve.

According to the first aspect of the present invention, it is judged at all times whether the opening degree of the currently-operated valve is coincident with the target value. Therefore, the switching operation of the control target valve from the currently-operated valve to the next valve can be quickly and accurately performed on the basis of the above judgment, and thus the total time needed to complete the opening degree control operation on all the valves can be shortened.

According to a second aspect of the present invention, an air conditioner having an outdoor unit, an indoor unit and a controller for controlling the operation of the outdoor unit and the indoor unit, in which at least one of the outdoor unit and the indoor unit is provided with a plurality of valves for controlling the flow of refrigerant circulating in the outdoor unit and the indoor unit, the valves being successively switched by the controller to control the opening degree of the electrically operated valves (perform the opening-degree operation of the electrically operated valves), is characterized in that the controller has switch means for immediately switching the control operation of the opening degree from a currently-operated valve whose opening degree is being currently controlled to a next valve when the opening degree of the currently-operated valve has reached a target opening degree within a one-operation time which is set to a fixed time for the control of the opening degree of each valve.

According to the second aspect of the present invention, when the valve being currently controlled (i.e., which is being subjected to the opening-degree control operation at present) has already reached a target opening degree within the one-operation time of each valve, controller immediately starts the opening degree control operation on the next valve. Therefore, a standby time (waste time) for which the valve concerned is not subjected to the opening degree control operation can be deleted, and thus the total time needed to complete the opening degree control operation of the valves can be shortened. Therefore, the controllability for the successive switching control (opening degree control) operation can be enhanced.

According to a third aspect of the present invention, an air conditioner having an outdoor unit, an indoor unit and a controller for controlling the operation of the outdoor unit and the indoor unit, in which at least one of the outdoor unit and the indoor unit is provided with a plurality of valves for controlling the flow of refrigerant circulating in the outdoor unit and the indoor unit, the valves being successively switched by the controller to control the opening degree of the electrically operated valves (perform the opening-degree operation of the electrically operated valves), is characterized in that the controller has time extending means for extending a one-operation time of a currently-operated valve whose opening degree is being currently controlled until the opening degree of the currently-operated valve reaches a target opening degree when the opening degree of the currently-operated valve has not reached the target opening degree within the one-operation time which is set to a fixed time for the control of the opening degree of each valve.

According to the third aspect of the present invention, when the valve being currently controlled does not reach a target opening degree within the one-operation time of each valve, the controller extends the one-operation time of the valve concerned until the opening degree reaches the target opening degree. Therefore, the opening degree of the valve can be set to the target opening degree within the one-time operation (i.e., by only one opening degree control operation). Therefore, in order to set the opening degree of the valve concerned to a target value, it is unnecessary to wait for the next operation time for the valve concerned which will come after the total time of the one-operation times allocated to the other plural valves elapses, and thus the opening degree of the valve concerned can be quickly set to the target value.

According to a fourth aspect of the present invention, an air conditioner having an outdoor unit, an indoor unit and a controller for controlling the operation of the outdoor unit and the indoor unit, in which at least one of the outdoor unit and the indoor unit is provided with a plurality of valves for controlling the flow of refrigerant circulating in the outdoor unit and the indoor unit, the valves being successively switched by the controller to control the opening degree of the electrically operated valves (perform the opening-degree adjusting operation of the electrically operated valves), is characterized in that the controller has priority altering means for altering priorities assigned to the respective valves in decreasing order of the operating frequency of the valves in accordance with an operation situation of the air conditioner.

According to the fourth aspect of the present invention, the controller alters the priorities assigned to the respective valves in decreasing order of the operating frequency of the valves in accordance with the operating condition of the air conditioner. Therefore, the valves are successively subjected to the opening degree control operation in the order from the highest-priority valve which may be varied in accordance with any operating condition. Therefore, a valve needing the opening degree control operation with the highest priority under the operating condition can be subjected to the opening degree control operation with no delay, and thus the controllability of successively switching the plural valves to control the opening degree of the valves can be enhanced.

According to a fifth aspect of the present invention, a valve control method of controlling a plurality of valves for controlling the flow of refrigerant circulating in a refrigerant circuit of an air conditioner having at least one outdoor unit and at least one indoor unit, comprising the steps of: operating one of said valves to control the opening degree of said valve to a target value; judging whether the current opening degree of the currently-operated valve is coincident with the target value; and switching the target value of the opening degree control operation from the currently-operated valve to a next valve.

According to the fifth aspect of the present invention, it is judged at all times whether the opening degree of the currently-operated valve is coincident with the target value. Therefore, the switching operation of the control target valve from the currently-operated valve to the next valve can be quickly and accurately performed on the basis of the above judgment, and thus the total time needed to complete the opening degree control operation on all the valves can be shortened.

BRIEF DESCRIPTION OF THE DRAWINGS

FIG. 5 is a flowchart showing the control of an electrically operated valve which is performed in a third embodiment of the air conditioner.

DETAILED DESCRIPTION OF THE PREFERRED EMBODIMENTS

Preferred embodiments according to the present invention will be described hereunder with reference to the accompanying drawings.

[First embodiment]

Figure 1:
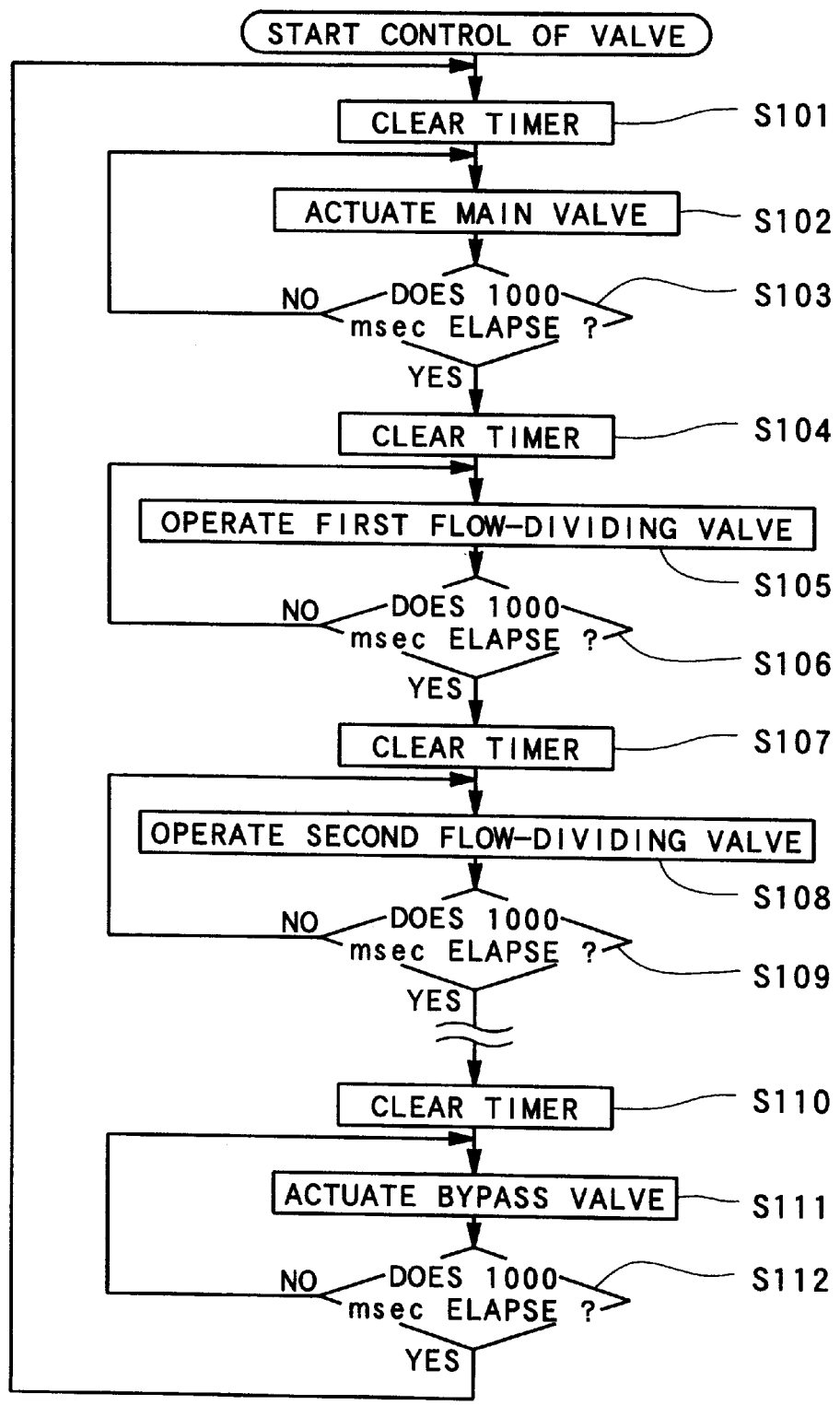
FIG. 1 is a flowchart showing the control of an electrically operated valve which is performed by a controller of a conventional air conditioner.
Figure 2:
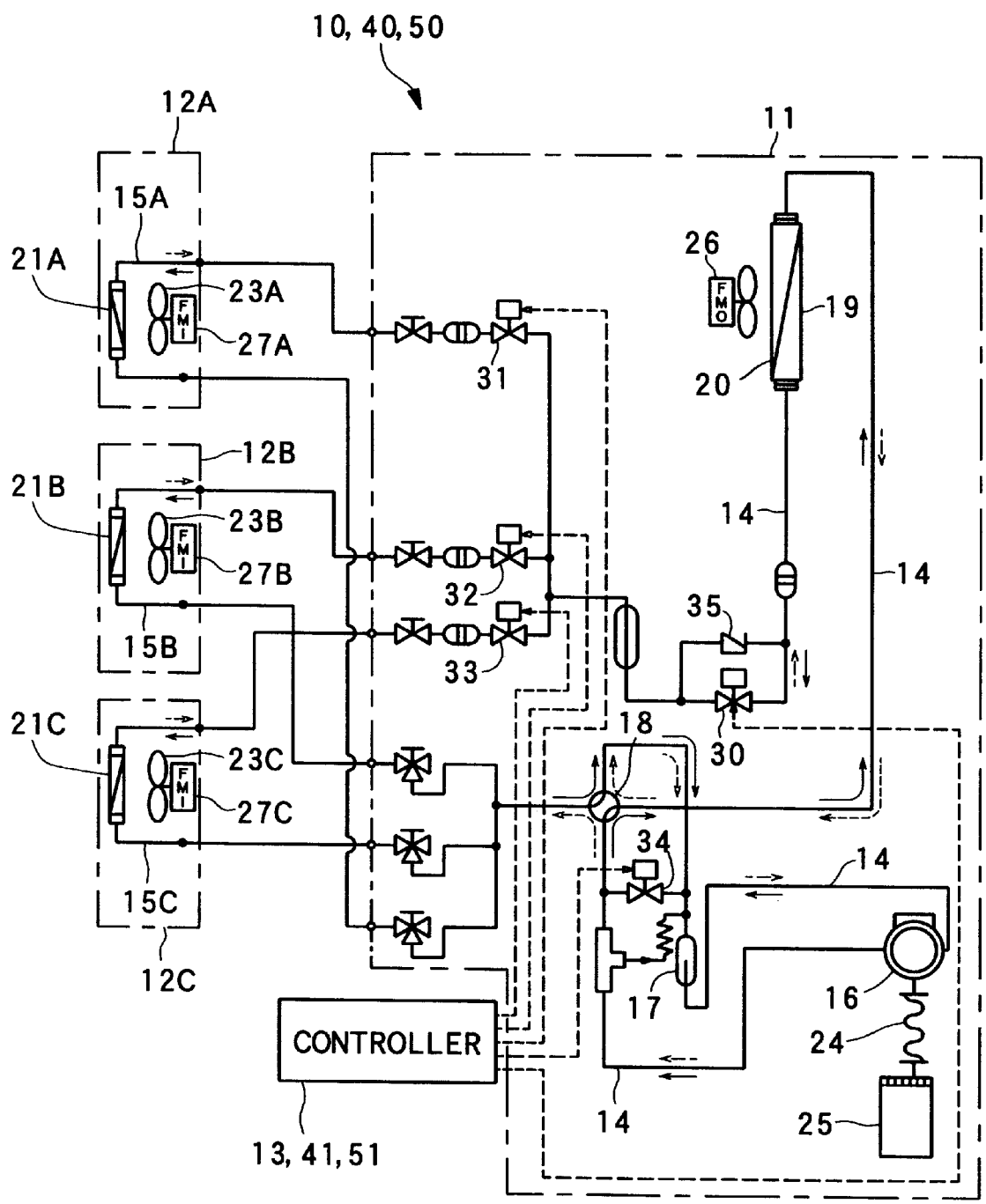
FIG. 2 is a diagram showing a refrigerant circuit according to a first embodiment of an air conditioner of the present invention.

FIG. 2 is a diagram showing a refrigerant circuit of a first embodiment of an air conditioner according to the present invention.

As shown in FIG. 2, an air conditioner 10 includes an outdoor unit 11, a plurality of (for example, three) indoor units 12A, 12B, 12C and a controller 13. An outdoor refrigerant pipe 14 of the outdoor unit 11 and each of indoor refrigerant pipes 15A, 15B, 15C of the indoor units 12a, 12B, 12C are linked to each other.

The outdoor unit 11 is disposed outdoors, and a compressor 16 is disposed in the outdoor refrigerant pipe 14. Further, an accumulator 17 and a four-way change-over valve 18 are connected through the outdoor refrigerant pipe 14 to the refrigerant suction and discharge sides of the compressor 16, respectively. An outdoor heat exchanger 19 is connected to the four-way change-over valve 18 through the outdoor refrigerant pipe 14. An outdoor fan 20 for blowing air to the outdoor heat exchanger 19 is disposed adjacently to the outdoor heat exchanger 19. The compressor 16 is linked to a gas engine 25 through a flexible coupling 24, and driven by the gas engine 25.

Each of the indoor units 12A, 12B, 12C is disposed indoors, and indoor heat exchangers 21A, 21B, 21C are disposed in the indoor refrigerant pipes 15A, 15B, 15C. Further, indoor fans 23A, 23B, 23C for blowing air to the indoor heat exchangers 21A, 21B, 21C respectively are disposed adjacently to the indoor heat exchangers 21A, 21B, 21C respectively.

The controller 13 controls the operation of the outdoor unit 11, the indoor units 12A, 12B, 12C, etc., and more specifically it controls the gas engine 25, the four-way change-over valve 18 and a fan driving motor 26 of the outdoor fan 20 in the outdoor unit 11, and fan driving motors 27A, 27B, 27C for driving the indoor fans 23A, 23B, 23C of the indoor units 12A, 12B, 12C. Further, the controller 13 controls the opening degree of each of a main electrically operated valve 30, a first flow-dividing electrically-operated valve 31, a second flow-dividing electrically-operated valve 32, a third flow-dividing electrically-operated valve 33 and a bypass electrically-operated valve 34.

The four-way change-over valve 18 is switched by the controller 13 to set the operation of the air conditioner 10 to cooling operation or heating operation. That is, when the controller 13 switches the four-way change-over valve 18 to the cooling operation side, refrigerant flows as indicated by a solid-line arrow, and the outdoor heat exchanger 19 is serves as a condenser while each of the indoor heat exchangers 21A, 21B, 21C serves as an evaporator, thereby setting the air conditioner to the cooling operation state. In this case, each of the indoor heat exchangers 21A, 21B, 21C cools the inside of a room. Further, on the other hand, when the controller 13 switches the four-way change-over valve 18 to the heating operation side, the refrigerant flows as indicated by a broken-line arrow, and each of the indoor heat exchangers 21A, 21B, 21C serves as a condenser while the outdoor heat exchanger 19 serves as an evaporator, thereby setting the air conditioner to the heating operation state. In this case, each of the indoor heat exchangers 21A, 21B, 21C heats the inside of the room.

The main electrically-operated valve 30 is disposed in parallel to a check valve 35 nearly at the downstream side of the outdoor heat exchanger 19 under the cooling operation in the outdoor refrigerant pipe 14 of the outdoor unit 11. The opening degree of the main electrically-operated valve 30 is controlled and set in accordance with the total air conditioner of the indoor units 12A, 12B and 12C under the cooling operation or heating operation of the air conditioner 10, thereby controlling the flow of the refrigerant.

The first flow-dividing electrically-operated valve 31, the second flow-dividing electrically-operated valve 32 and the third flow-dividing electrically-operated valve 33 are disposed in parallel to one another at the downstream side of the main electrically-operated valve 30 under the cooling operation in the outdoor refrigerant pipe 14 of the outdoor unit 11. The opening degree of each of these first, second and. third flow-dividing electrically-operated valves 31, 32 and 33 is controlled and set in accordance with the air conditioning load of each of the indoor units 12A, 12B, 12C, thereby controlling the flow of the refrigerant. For example, each of the first, second and third flow-dividing electrically-operated valves is fully closed when the driving of the corresponding indoor unit 12A, 12B, 12C is stopped.

The bypass electrically-operated valve 34 is disposed between the compressor 16 and the four-way change-over valve 18 in the outdoor refrigerant pipe 14 of the outdoor unit 11. When the refrigerant pressure at the discharge side of the compressor 16 rises up under the cooling operation or heating operation of the air conditioner and thus the load of the gas engine is increased, the opening degree of the bypass electrically-operated valve 34 is controlled to be set to a large value, and the refrigerant discharged from the compressor 16 is leaked to the suction side of the compressor 16.

Each of the main electrically-operated valve 30, the first flow-dividing electrically-operated valve 31, the second flow-dividing electrically-operated valve 32, the third flow-dividing electrically-operated valve 33 and the bypass electrically-operated valve is driven by a stepping motor, for example, and the controller 13 controls the opening degree of each of the electrically-operated valves 30 to 34 by controlling the rotational position of the stepping motor.

The controller 13 fixedly (invariably) sets priorities to the electrically-operated valves 30 to 34 in order of reducing the valve operating frequency. In this embodiment, the highest priority is assigned to the main electrically-operated valve 30, and the second, third and fourth highest priorities are assigned to the first, second and third flow-dividing electrically-operated valves 31, 32, 33 in this order. The lowest priority is assigned to the bypass electrically-operated valve 34. The controller 13 starts the opening degree control operation from the main electrically-operated valve 30 having the highest priority, and then switches the control target to the first flow-dividing electrically-operated valve having the secondly highest priority. Subsequently, the control operation is shifted to the second flow-dividing electrically-operated valve 32, the third flow-dividing electrically-operated valve 33 and the bypass electrically-operated valve 34 in this order.

The controller 13 uniformly sets to a fixed time the one-operation time needed to execute the opening degree control operation on each of the electrically-operated valves 30 to 34. This embodiment is characterized in that the controller 13 switches the control target to the next highest-priority valve (30 to 34) immediately when the opening degree of each of the electrically-operated valves 30 to 34 has reached a target value within the one-operation time (i.e., even before the one-operation time elapses).

Figure 3:
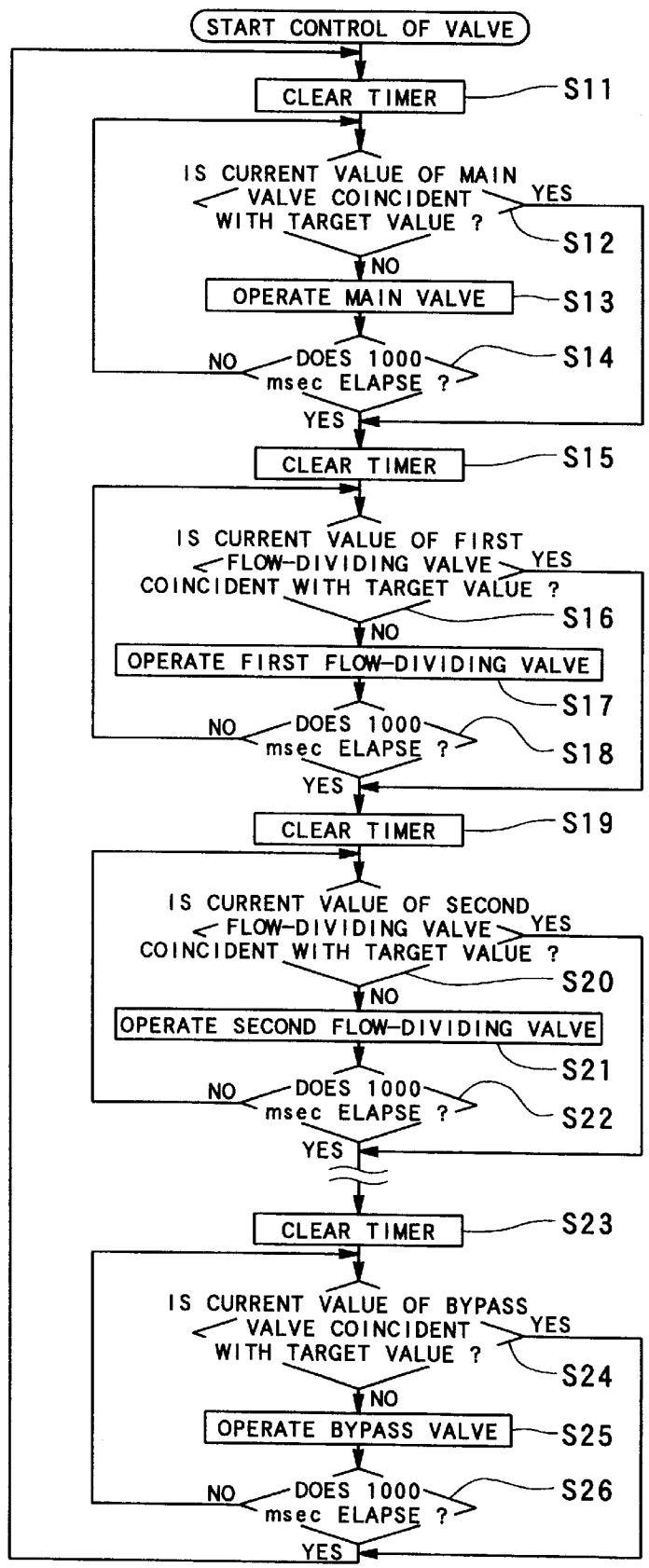
FIG. 3 is a flowchart showing the control of an electrically operated valve which is performed in the first embodiment of the air conditioner of FIG. 2.

FIG. 3 is a flowchart showing the above processing of the controller. As shown in FIG. 3, the controller 13 clears a built-in timer simultaneously with start of the control of the electrically-operated valves 30 to 34 (step S11) and judges whether the current opening degree (current value) of the highest-priority valve (main electrically-operated valve 30) has reached a target opening degree (target value) (step S12). If the current opening degree of the main electrically-operated valve 30 has not yet reached the target value, the controller 13 controls the opening degree of the main electrically-operated valve 30 (step S13) and judges whether the one-operation time (for example, 1000 msec) elapses (step S14). If the one-operation time does not elapse, the above steps S12 to S14 are repeated.

If the one-operation time is judged to elapse in step S 14 or if the current opening degree of the main electrically-operated valve 30 reaches the target value before the one-operation time elapses in S12, the controller 13 immediately clears the timer (step S15) and judges whether the current opening degree of the secondly highest-priority first flow-dividing electrically-operated valve 31 has reached a target value (step S16). If the current opening degree of the first flow-dividing electrically-operated valve 31 has not yet reached the target value, the controller 13 controls the opening degree of the first flow-dividing electrically-operated valve 31 (step S17), and judges whether the one-operation time elapses (step S17). If the one-operation time does not elapse, the above steps S16 to S18 are repeated.

If the one-operation time elapses in step S18 or if the current opening degree of the first flow-dividing electrically-operated valve 31 has reached the target value before the one-operation time elapses, the controller 13 immediately clears the timer (step S19), and judges whether the current opening degree of the thirdly highest-priority second flow-dividing electrically-operated valve 32 has reached a target value (step S20). IF the current opening degree of the second flow-dividing electrically-operated valve 32 has not yet reached the target value, the controller 13 controls the opening degree of the second flow-dividing electrically-operated valve 32 (step S21) and judges whether the one-operation time (for example, 1000 msec) elapses (step S82). If the one-operation time does not elapses, the above steps S20 to S22 are repeated.

The controller 13 controls the opening degree of the third flow-dividing electrically-operated valve 33 in the same manner as the first flow-dividing electrically-operated valve 31 and the second flow-dividing electrically-operated valve 32.

Finally, when the one-time operation of the third flow-dividing electrically-operated time elapses or if the current opening degree of the third flow-diving electrically-operated valve 33 has reached a target value before the one-operation time elapses, the controller 13 immediately clears the timer (step S23) and judges whether the current opening degree of the lowest-priority bypass electrically-operated valve 34 has reached a target value (step S24). If the current opening degree of the bypass electrically-operated valve 34 has not yet reached the target value, the controller 13 controls the opening degree of the bypass electrically-operated valve 34 (step S25) and judges whether the one-operation time (for example, 1000 msec) elapses (step S26). If the one-operation time does not elapse, the above steps S24 to S25 are repeated.

When the one-operation time elapses in step S26 or if the current opening degree of the bypass electrically-operated valve 34 has reached the target value in step S24, the controller 13 returns to step S11 to repeat the steps S11 to S26.

Accordingly, the air conditioner 10 of this embodiment has the following effect.

When the opening degree of the currently-controlled valve (for example, the main electrically-operated valve 30) has already reached the target value within the one-operation time of the electrically-operated valves 30 to 34, the controller 13 immediately switches the control target to the next electrically-operated valve (for example, the first flow-dividing electrically-operated valve 31). Therefore, a standby time (waste time) for which each of the electrically-operated valves 30 to 34 is not operated during the one-operation time of the valve can be deleted from the one-operation time, so that the total operation time needed for the opening degree control operation of all the electrically-operated valves 30 to 34 can be shortened and the controllability when the plural electrically-operated valves 30 to 34 are successively switched and controlled (opening degree control operation) can be enhanced.

{Second Embodiment}

Figure 4:
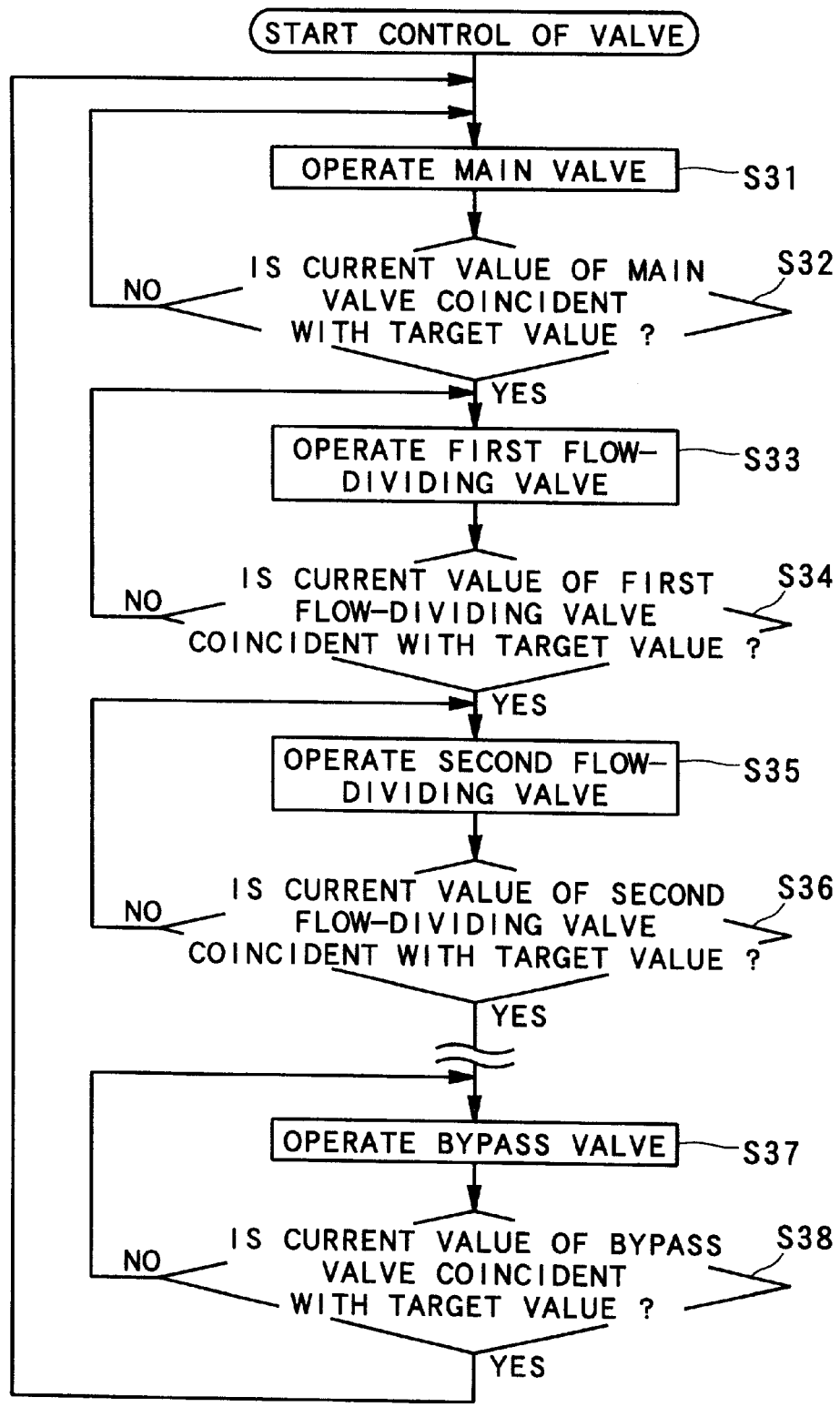
FIG. 4 is a flowchart showing the control of an electrically operated valve which is performed in a second embodiment of the air conditioner.

FIG. 4 is a flowchart showing the control of the electrically-operated valve which is performed by the controller of the second embodiment of the air conditioner of the present invention. In the second embodiment, the same elements as the first embodiment are represented by the same reference numerals.

A controller 41 of an air conditioner 40 of the second embodiment fixedly (invariably) assigns the priorities to the electrically-operated valves 30 to 34 in order of reducing the valve operating frequency, and performs the opening degree control operation by successively switching the control target to the main electrically-operated valve 30, the first flow-dividing electrically-operated valve 31, the second flow-dividing electrically-operated valve 32, the third flow-dividing electrically-operated valve 33 and the bypass electrically-operated valve 34 in this order. Further, the air conditioner 40 uniformly sets the one-operation time of each electrically-operated valve 30 to 34 to a fixed time. The air conditioner 40 of this embodiment is characterized in that when the opening degree of each of the electrically-operated valves 30 to 34 does not reach a target value within the one-operation time, the one-operation time of the electrically-operated valve concerned is extended until the opening degree thereof reaches the target value.

FIG. 4 is a flowchart showing the above operation. As shown in FIG. 4, upon start of the control of the electrically-operated valves 30 to 34, the controller 41 controls the opening degree of the highest priority main electrically-operated valve 30 within the one-operation time (step S31), and judges whether the current opening degree (current value) of the main electrically-operated valve 30 has reached a target opening degree (target value) after the above control operation (step S32). If the current opening degree of the main electrically-operated valve 30 has not yet reached the target value, the controller 41 extends the one-operation time of the main electrically-operated valve 30 and continues to control the opening degree of the main electrically-operated valve 30 until the opening degree reaches the target value (steps S31 and S32).

At the stage where the opening degree of the main electrically-operated valve 30 reaches the target value, the controller 41 starts to control the first flow-dividing electrically-operated valve 31 of the secondly highest priority within the one-operation time (step S33). Subsequently, the controller 41 judges whether the current opening degree of the first flow-dividing electrically-operated valve 31 has reached a target value after the above control operation (step S34). If the current opening degree of the first flow-dividing electrically-operated valve 31 does not reach the target value, the controller 41 extends the one-operation time of the first flow-dividing electrically-operated valve 31, and continues to control the opening degree of the first flow-dividing electrically-operated valve 31 until the opening degree thereof reaches the target value (steps S33 and S34).

At the stage where the opening degree of the first flow-dividing electrically-operated valve 31 reaches the target value, the controller 41 starts to control the second flow-dividing electrically-operated valve 32 of the thirdly highest priority within the one-operation time (step S359. Subsequently, the controller 41 judges whether the current opening degree of the second flow-dividing electrically-operated valve 32 after the above control operation has reached the target value (step S36). If the current opening degree of the second flow-dividing electrically-operated valve 32 does not reach the target value, the controller 41 extends the one-operation time of the second flow-dividing electrically-operated valve 32 and continues to control the opening degree of the second flow-dividing electrically-operated valve 32 until the opening degree thereof reaches the target value (steps S35 and S36).

Subsequently, the controller 41 subjects the third flow-dividing electrically-operated valve 33 to the fourthly highest priority the same opening degree control operation as the steps S35 and S36.

At the stage where the opening degree of the third flow-dividing electrically-operated valve 33 reaches a target value, the controller 41 starts to control the opening degree of the next highest (lowest) bypass electrically-operated valve 34 within the one-operation time (step S37). Subsequently, the controller 41 judges whether the current opening degree of the bypass electrically-operated valve 34 after the above control operation has reached a target value (Step S38). If the current opening degree of the bypass electrically-operated valve 34 does not reach the target opening degree, the controller 41 extends the one-operation time of the bypass electrically-operated valve 34 and continues to control the opening degree control operation until the opening degree of the bypass electrically-operated valve 34 reaches the target value (steps S37 and S38).

Accordingly, the air conditioner 40 of this embodiment has the following effect.

When the opening degree of an electrically-operated valve (30 to 34) being currently controlled has not yet reached the target value within the one-operation time thereof, the controller 13 extends the one-operation time of the valve concerned until the opening degree of the valve concerned reaches the target value. Therefore, the opening degree of each of the electrically-operated valves 30 to 34 can be set to the target value within the one-operation time (i.e., through only one operation). Therefore, in order to set the opening degree of a valve (for example, the main electrically-operated valve 30), it is unnecessary to wait for a next operation time thereof which will come after the total time of the one-operation times for the other valves (the first to third flow-dividing electrically-operated valves 31 to 33 and the bypass electrically-operated valve 34) elapses. As a result, the opening degree of the valve concerned (the main electrically operated valve 39) can be quickly set to the target value. As a result, the controllability when the plural electrically-operated valves 30 to 34 are successively switched and controlled (opening degree control operation) can be enhanced.

[Third Embodiment]

FIG. 5 is a flowchart showing the control of the electrically-operated valves which is performed by the controller of the third embodiment of the air conditioner according to the present invention. In the third embodiment, the same elements as the first embodiment are represented by the same reference numerals.

A controller 51 of an air conditioner 50 of the third embodiment assigns the priorities to the electrically-operated valves 30 to 34 in order of reducing the valve operating frequency and also reassigns the priorities to the electrically-operated valves in accordance with the operating condition of the air conditioner 50.

FIG. 5 is a flowchart showing the above control operation. As shown in FIG. 5, the controller 51 first carries out the opening degree control of an electrically-operated valve having a priority 1 within the one-operation time (step S41), and then carries out the opening degree control of an electrically-operated valve having a priority 2 within the one-operation time (step S42). Thereafter, the controller 51 carries out the opening degree control of an electrically-operated valve having a priority 3 within the one-operation time (step S43), and then carries out the opening degree control of an electrically-operated valve having a priority 4 within the one-operation time (step S44) Finally the controller carries out the opening degree control of an electrically-operated valve having a priority 4 within the one-operation time (step S45).

In general, the controller 51 carries out the opening degree control operation in priority order, that is, it carries out the opening degree control operation of the main electrically-operated valve 30, the first flow-dividing electrically-operated valve 31, the second flow-dividing electrically-operated valve 32, the third flow-dividing electrically-operated valve 33 and the bypass electrically-operated valve 34 in this order. However, the controller 51 reassign (varies) the priorities in accordance with the situation of the air conditioner. For example, when the load of the gas engine 25 is increased, the controller 51 reassigns the priority 1 to the bypass electrically-operated valve 34 and then performs the opening degree control operation on the valves. Further, when the driving of the indoor unit 12A is stopped, the controller 51 reassigns the priority 5 to the first flow-dividing electrically-operated valve 31 and then performs the opening degree control operation on the valves.

Accordingly, the air conditioner 50 of this embodiment has the following effect.

The controller varies, in accordance with the driving condition of the air conditioner 50, the priorities which are originally assigned to the electrically-operated valves in order of reducing the valve operating frequency. Therefore, the opening degree control operation is started from an electrically-operated valve which is most strongly required to be subjected to the opening degree control operation in accordance with any driving condition of the air conditioner 50. Therefore, the electrically-operated valve which is most strongly required to be subjected to the opening degree control operation under the driving condition can be subjected to the opening degree control operation with no delay, and the controllability when the plural electrically-operated valves 30 to 34 are successively switched and controlled (subjected to the opening degree control operation) can be enhanced.

The present invention is not limited to the above embodiments, and various modifications may be made without departing from the subject matter. For example, in each of the above-described embodiments, the first, second and third flow-dividing electrically-operated valves 31, 32 and 33 are disposed in the outdoor refrigerant pipe 14, however, they may be disposed in the indoor refrigerant pipes 15A, 15B, 15C, respectively.

Further, each of the first, second and third flow-dividing valves 31, 32 and 33 and the bypass valve 34 comprises an electrically-operated (motor-operated) valve, however, each of these valves may comprise an electromagnetic valve or a pneumatic driving valve which can be remotely controlled by the controller 13, 41, 51. Still further, the number of outdoor units and the number of indoor units used in the air conditioner of the present invention are not limited to specific values.

As described above, according to the air conditioner of the present invention, the plural valves for controlling the flow of the refrigerant circulating in the outdoor unit and the indoor units are successively switched to be subjected to the opening degree control operation by the controller. When the opening degree of a valve under control has reached a target value even within the one-operation time which is set to a fixed time for each valve, the controller immediately switches the control target to a next valve. Therefore, the controllability when the plural valves are successively switched and controlled can be enhanced.

What is claimed is:

1. An air conditioner having at least one outdoor unit, at least one indoor unit and a controller for controlling the operation of the outdoor unit and the indoor unit, in which at least one of the outdoor unit and the indoor unit is provided with a plurality of valves for adjusting the flow of refrigerant circulating in the outdoor unit and the indoor unit, the valves being successively switched by the controller to control the opening degree of each of the valves (perform the opening-degree control operation of the valves), characterized in that said controller has judgment means for judging whether the current opening degree of a valve which is currently being subjected to the opening degree control operation is coincident with a target value, and switching means for switching the control target valve from the currently-controlled valve to a next valve.

2. The air conditioner as claimed in claim 1, wherein said switch means of said controller immediately switches the opening degree control operation from the currently-controlled valve to the next valve when the opening degree of the currently-operated valve has reached a target opening degree even within a one-operation time which is set to a fixed time for the control of the opening degree of each valve.

3. The air conditioner as claimed in claim 1, wherein said controller has time extending means for extending a one-operation time which is set to a fixed time for the control of the opening degree for the currently-controlled valve until the opening degree of the currently-controlled valve reaches a target opening degree when the opening degree of the currently-operated valve has not reached the target opening degree within the one-operation time.

4. An air conditioner having at least one outdoor unit, at least one indoor unit and a controller for controlling the operation of the outdoor unit and the indoor unit, in which at least one of the outdoor unit and the indoor unit is provided with a plurality of valves for controlling the flow of refrigerant circulating in the outdoor unit and the indoor unit, the valves being successively switched by the controller to control the opening degree of the electrically operated valves (perform the opening-degree adjusting operation of the electrically operated valves), characterized in that said controller has priority altering means for altering priorities assigned to the respective valves in decreasing order of the valve operating frequency in accordance with an operational situation of said air conditioner.

5. A valve control method of controlling a plurality of valves for controlling the flow of refrigerant circulating in a refrigerant circuit of an air conditioner having at least one outdoor unit and at least one indoor unit, comprising the steps of:

operating one of said valves to control the opening degree of said valve to a target value;

judging whether the current opening degree of said currently-operated valve is coincident with the target value; and switching the target value of the opening degree control operation from the currently-operated valve to a next valve.

6. The valve control method as claimed in claim 5, wherein in said switching step the opening degree control operation is immediately switched from the currently-controlled valve to the next valve when the opening degree of the currently-operated valve has reached the target opening degree even within a one-operation time which is set to a fixed time for the control of the opening degree of each valve.

7. The valve control method as claimed in claim 5, further comprising the step of extending a one-operation time which is set to a fixed time for the control of the opening degree for the currently-operated valve until the opening degree of the currently-controlled valve reaches the target value when the opening degree of the currently-operated valve has not reached the target value within the one-operation time.

8. The valve control method as claimed in claim 5, further comprising the steps of:

assigning priorities to said valves; and altering the priorities assigned to said valves in accordance with an operational situation of said air conditioner to reassign priorities to said valves.

* * * * *